(12) United States Patent
Combs et al.

(10) Patent No.: US 9,307,063 B2
(45) Date of Patent: Apr. 5, 2016

(54) CAMERA CELL PHONE WITH INTEGRATED WIRELESS MOUSE

(75) Inventors: Steven Donald Combs, Lexington, KY (US); Joseph Wade Luciano, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 948 days.

(21) Appl. No.: 13/249,803

(22) Filed: Sep. 30, 2011

(65) Prior Publication Data

US 2013/0084917 A1 Apr. 4, 2013

Related U.S. Application Data

(62) Division of application No. 12/018,262, filed on Jan. 23, 2008, now Pat. No. 8,041,389.

(51) Int. Cl.
*H04M 1/00* (2006.01)
*H04M 1/21* (2006.01)

(52) U.S. Cl.
CPC ..................................... *H04M 1/21* (2013.01)

(58) Field of Classification Search
CPC ..... H04W 88/02; H04M 1/0229; H04M 1/02; H04M 1/0264; H04M 2250/52; H04M 1/00; H04B 1/38
USPC ............ 455/66.1, 90.3, 128, 347–349, 550.1, 455/552.1, 556.1–556.2, 557–558, 575.1, 455/575.3, 575.8; 348/14.01–14.04, 348/174–175, 241, 252; 345/163–169, 173, 345/175, 181, 204–205, 211, 694, 697–698
See application file for complete search history.

(56) References Cited

U.S. PATENT DOCUMENTS

| | | | |
|---|---|---|---|
| 6,992,699 B1* | 1/2006 | Vance et al. | 348/207.99 |
| 7,366,540 B2* | 4/2008 | Ansari et al. | 455/556.1 |
| 7,423,689 B2* | 9/2008 | Kim et al. | 348/374 |
| 7,711,256 B2* | 5/2010 | Wun | 396/56 |
| 7,783,184 B2 | 8/2010 | Chi | |
| 7,948,473 B2* | 5/2011 | Yu et al. | 345/163 |
| 8,041,389 B2* | 10/2011 | Combs et al. | 455/556.1 |
| 2002/0021903 A1* | 2/2002 | Ito et al. | 396/429 |
| 2002/0142798 A1* | 10/2002 | Miyake | 455/556 |
| 2003/0040346 A1* | 2/2003 | Fukuda et al. | 455/575 |
| 2005/0139672 A1* | 6/2005 | Johnson et al. | 235/454 |
| 2005/0186907 A1 | 8/2005 | Tailor | |
| 2005/0219396 A1* | 10/2005 | Tella | 348/335 |
| 2005/0245295 A1* | 11/2005 | Lee et al. | 455/575.1 |
| 2005/0253923 A1* | 11/2005 | Komori et al. | 348/14.02 |
| 2005/0279921 A1* | 12/2005 | Raynor | 250/225 |
| 2006/0003709 A1 | 1/2006 | Wood | |
| 2006/0152576 A1* | 7/2006 | Kiessling et al. | 348/14.01 |
| 2006/0279732 A1* | 12/2006 | Wang et al. | 356/326 |
| 2007/0139380 A1* | 6/2007 | Huang | 345/166 |
| 2007/0272994 A1* | 11/2007 | Huang et al. | 257/434 |

* cited by examiner

*Primary Examiner* — Meless Zewdu

(57) ABSTRACT

An accessory for a hand-held electronics device having an integrated camera unit includes a member for attachment along an outer surface of the hand-held electronics device, the member having an aperture defined therethrough. The aperture is positioned along the member such that when the member is attached to the hand-held electronics device, the aperture is positioned adjacent the camera unit of the hand-held electronics device to allow for image capture thereby. A light element is disposed within the aperture and a lens mounted in a stationary position within the aperture of the member modifies the optical power of the camera unit.

13 Claims, 3 Drawing Sheets

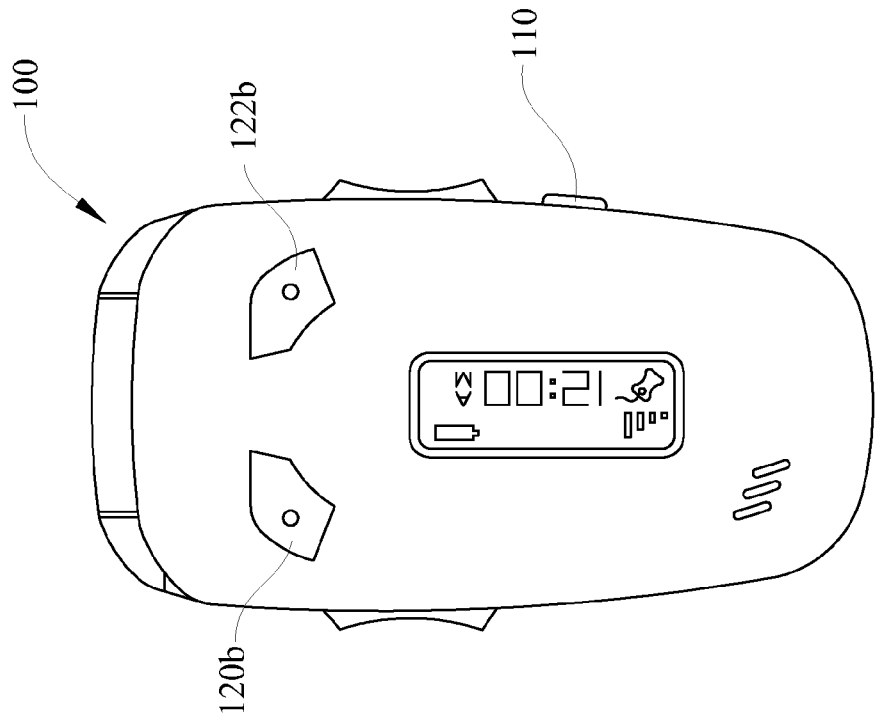
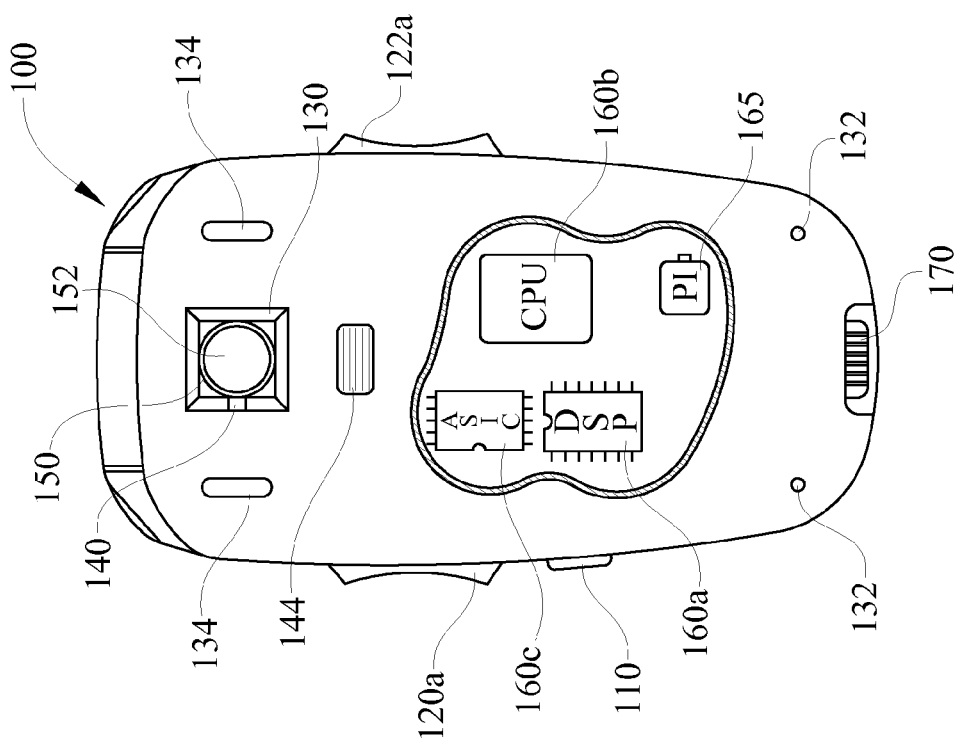

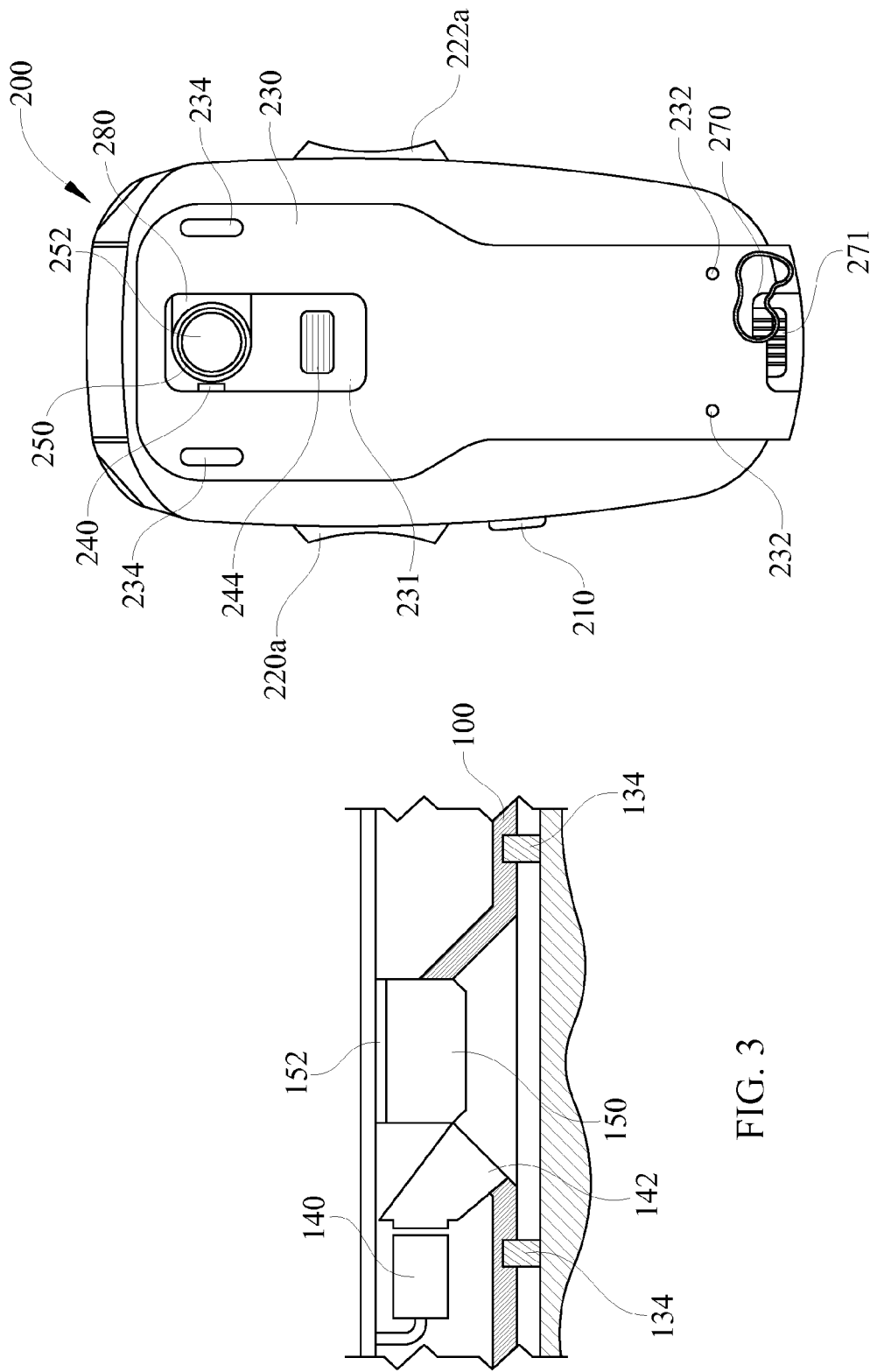

CAMERA CELL PHONE WITH INTEGRATED WIRELESS MOUSE

CROSS REFERENCES TO RELATED APPLICATIONS

Pursuant to 37 C.F.R. 1.78, this application is a divisional application and claims priority and benefit to U.S. patent application Ser. No. 12/018,262, filed Jan. 23, 2008, now U.S. Pat. No. 8,401,389 and having the same title.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to cellular telephone and optical mouse technology and, more particularly, to a cellular telephone having an integrated, optically-based means for measuring the movement of the telephone across an underlying surface and an integrated, wireless means for communicating such relative displacement to a computer.

2. Description of the Related Art

Various cellular telephones having integrated camera functions are commercially available. Such telephones typically employ an camera unit including an image sensor, a multiple element fixed-focus lens assembly that is optimized for imaging subjects located at least 100 mm from the lens assembly, and a lens barrel for positioning the elements of the lens assembly over the image sensor. The image sensor is typically a CMOS image sensor or a CCD image sensor, depending upon the design goals for camera functionality, e.g., low-light performance and image noise floor. State of the art telephones may substitute a variable-focus camera unit that can be switched between a normal mode and a "macro mode" optimized for imaging subjects located at least 20 mm from the lens assembly. The image sensors in basic telephone designs typically provide a VGA-equivalent resolution of 640 by 480 pixels, but state of the art telephone designs may incorporate image sensors providing UXGA or even QXGA-equivalent resolutions, i.e., 1600 by 1200 or 2048 by 1536 pixels. In most telephone designs, the camera function can also assemble a series of still images to construct a movie sequence with a frame rate of 10-30 frames per second, and camera function is operatively coupled to a supplemental source of illumination, such as a xenon flash, to permit the imaging of subjects under low-light conditions. In certain state of the art telephone designs, the telephone can be wirelessly interfaced with a computer through various RF communications technologies such as Bluetooth® to provide remote data communications and/or file transfer capabilities.

Various mice employing optical motion-sensing technology are also commercially available. Such mice typically combine an image sensor, a source of illumination, a digital signal processor, and a peripheral interface as a means for translating observed motion over an underlying surface, such as a desktop, into measurements of relative displacement which are communicated to a computer and computer operating system for use in manipulating a command element. The optical sensor typically employs a CMOS image sensor shielded by a single lens element/cover that is optimized for imaging a portion of the underlying surface located 5-10 mm below the sensor. The source of illumination, which is typically a light emitting diode (LED) or laser diode (LD), is offset from the image sensor and oriented so that light is emitted toward a surface below the optical sensor, scattered off the underlying surface, and collected in photosites in the image sensor. The digital signal processor is programmed to sample the image sensor at a comparatively high frame rate, on the order of 1500 to 6500 frames per second, and to track the apparent movement of microscopic features of the surface between successive frames to determine the relative displacement of the mouse. This relative displacement is subsequently communicated to the peripheral interface, to a computer, and to computer operating system as an input for controlling a command element such as a cursor. These image sensors typically have a resolution of between 16 by 16 and 30 by 30 pixels, although other resolutions of comparable magnitude may be found in sensors marketed by various manufacturers. In certain state of the art mouse designs, the mouse can be wirelessly interfaced with a computer through various RF communications technologies such as Bluetooth® to control a command element such as a GUI cursor.

Camera phones and optical mice have become ubiquitous in business environments, but each is sold and used as a stand-alone device in accord with its intended function. However, and particularly in business travel situations, such a multiplicity of devices contributes to a number of problems, including the need to pack each device, the need to manage the cables associated with wired devices, the need to periodically recharge multiple wireless devices, etc. Moreover, mouse replacements such as laptop touch pads tend to be poor substitutes for mice, as they typically require a user to position themselves in front of the computer and behind the computer screen, so that a user making a presentation to an audience is at least partially obscured from their audience by a prominent barrier. Other mouse replacements such as remote presentation controls tend to be single function devices, providing a limited ability to control presentation software, but not the ability to fully control a command element such as a GUI cursor. Hence, it would be advantageous for certain users, such as business travelers, to combine certain existing cellular phone features with new optical, illuminating, and programming features to produce a cellular telephone having integrated wireless mouse functionality. Such an improved cellular telephone would permit a computer user to control a computer presentation without carrying a separate special purpose device, to avoid the need to manage an additional cable or battery-operated wireless device, and to avoid diminishing the effectiveness of a presentation by resort to a computer-integrated mouse replacement or limited function remote. Such an improved cellular telephone could also substitute for a mouse in situations where a computer user is away from their desk and/or laptop docking station.

SUMMARY

In a first aspect, an improvement to a cellular telephone providing an integrated camera unit, the improvement comprising a source of illumination positioned adjacent said camera unit and configured to illuminate a portion of an underlying surface within the field of view the camera unit; programming effective to (a) collect a current tracking image frame, (b) compare the current tracking image frame with a prior tracking image frame, (c) compute a relative displacement between the tracking image frames, and (d) store the current tracking image frame as a prior tracking image frame;

and a wireless peripheral interface, wherein the wireless peripheral interface communicates the relative displacement to a computer operating system.

In a second aspect, a method of retrofitting a cellular telephone having an integrated camera unit and wireless peripheral interface to provide wireless mouse functionality, the method comprising the steps of providing an accessory unit for engagement with the telephone, wherein the accessory unit is configured to position a source of illumination adjacent to the camera unit and to illuminate a portion of an underlying surface within the field of view the camera unit; and providing programming effective to (a) collect a current tracking image frame, (b) compare said current tracking image frame with a prior tracking image frame, (c) compute a relative displacement between said tracking image frames, (d) store said current tracking image frame as a prior tracking image frame, and (e) communicate the relative displacement to a computer operating system through the wireless peripheral interface.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a rear view of an exemplary cellular telephone having an integrated camera function;

FIG. 2 is a front view of the exemplary cellular telephone shown in FIG. 1;

FIG. 3 is a detail view of a cellular telephone embodying an exemplary aspect of the invention including an integrated LED illuminator and light guide;

FIG. 4 is a rear view of an exemplary cellular telephone having an integrated camera function coupled with an accessory unit having an integrated LED illuminator and optics.

DETAILED DESCRIPTION

Figure 5:
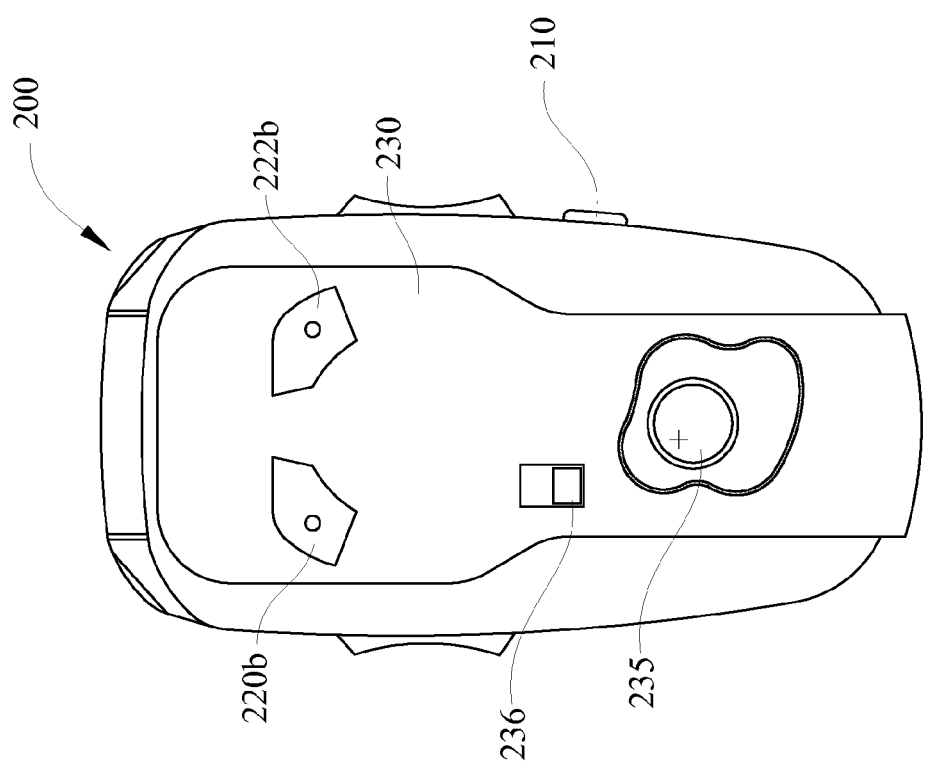
FIG. 5 is a front view of the exemplary cellular telephone and accessory unit shown in FIG. 4.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

In a first embodiment, shown in FIG. 1, a cellular telephone 100 including a camera unit 150 is provided. The telephone 100 includes a plurality of interface buttons, some of which may be disposed on the sides of the device. At least one such button 110 may be used to activate and deactivate a wireless mouse functionality, described in further detail below. One such button 120a may be provided on the side of the telephone 100 and programmed to act as a primary mouse button when the device is operated as a mouse. Preferably, a second such button 122a is provided on the opposite side of the telephone 100 from the first button 120a and programmed to act as a secondary mouse button when the device is operated as a mouse, simulating the functionality of a two-button mouse. Optionally, the functionality of the buttons 110, 120a, 122a may be multiplexed to reduce the number of buttons required, so that a particular type or sequence of button commands can activate and deactivate the wireless mouse functionality. For example, the simultaneous pressing of buttons 120a and 122a for a sustained period of time, e.g., about 3-5 seconds, may substitute for the pressing of an otherwise distinct activation/deactivation button 110. Also optionally, as shown in FIG. 2, first and second buttons 120b, 122b may instead be provided on the side of the telephone 100 opposite the camera unit 150 and positioned near an end of the telephone to simulate a typical two button mouse configuration.

With further reference to FIG. 1, the telephone 100 is configured to suspend the camera unit 150 immediately above an underlying surface, such as a desktop, when the telephone is set down on such a surface. A portion of the housing may define a shallow recess 130, with the camera unit 150 positioned within the recess 130 for suspension over an underlying surface. Alternately, the telephone housing may include spacing elements such as foot portions 132 and/or glide pads 134 projecting outward from the housing. The foot portions 132 and/or glide pads 134 may act to both suspend the camera unit 150 above the underlying surface and to protect both the telephone housing and surface from cosmetic damage when the telephone 100 is manipulated in the manner of a mouse. The recess 130 and foot portions 132 and/or glide pads 134 may also be combined to provide a more robust design.

With reference to FIG. 3, a source of illumination 140 is positioned adjacent the camera unit 150 and configured to illuminate a portion of an underlying surface within the field of view the camera unit 150, i.e., in most designs, to direct light through the space immediately below the camera unit 150 for reflection off an opposing surface. The source of illumination 140 may be mounted to the housing at an acute angle with respect to the general plane of that portion of the housing to direct the illumination in the described matter, or the source of illumination 140 may be mounted inside the telephone 100, with a transparent lens or light guide 142 acting to direct the illumination through the housing and outward in the described manner. The source of illumination 140 preferably comprises an LED or LD, and more preferably comprises an LED or LD emitting monochromatic light having a peak wavelength that is approximately equal to the wavelength of peak sensitivity for one of the channels of the image sensor in the camera unit 150. The source of illumination 140 is separate from the telephone's flash cell 144, if present, and provides a directed, low-intensity, and energy-efficient source of illumination for the camera unit 150 when the telephone 100 is operated with wireless mouse functionality.

The camera unit 150 includes an imaging sensor 152 which is preferably a CMOS imaging sensor, although CCD imaging sensors or other imaging sensors may be used depending upon the design goals for the telephone's camera and mouse functions. Such imaging sensors typically include three types of photosites, corresponding to red, blue, and green color channels for the recording of an image in an RGB colorspace, although sensors designed for and operating in other colorspaces such as CMYK colorspaces have been developed in the imaging arts and may be incorporated into the camera unit 150 instead. The photosites in such a sensor are typically provided in the form of a Bayer filter sensor, with each pixel in a resulting image being constructed by mathematically interpolating color information from a corresponding photosite (nominally recording an intensity for a single color channel) and a plurality of surrounding photosites (nominally recording intensities for a single color channel each) to produce estimated values in each color channel at each photosite in a process known as demosaicing. However, when operating with wireless mouse functionality, the telephone 100 may instead construct a reduced resolution, single channel, non-interpolated image (hereinafter described as a reduced tracking image frame) by processing information from only one type of photosite, e.g., red-recording photosites. Such processing both reduces the quantity of data to be manipulated and eliminates the processing associated with demosaicing. The telephone 100 may be programmed in a manner which reallocates resources normally dedicated to temporary image storage and demosaicing, compares a current reduced tracking image frame against a prior recorded reduced tracking image frame, computes a relative displacement using known image comparison algorithms, and stores the current reduced tracking image frame as a prior reduced tracking image frame for subsequent computations. Such programming is preferably accomplished through a stored program running on a programmable digital signal processor (DSP) 160a or central processing unit (CPU) 160b, but may be provided in whole or in part through the use of application-specific integrated circuits (ASICs) 160c, and may less preferably comprise a separate image processing subsystem from that used to process still photographs and/or video. The telephone 100 is programmed or otherwise configured to activate the source of illumination 140 when operating with wireless mouse functionality and to deactivate the source of illumination when operating in other modes, such as a still photographic mode.

The computed relative displacement is communicated to a peripheral interface 165, which may be the same interface employed to wirelessly interface the telephone 100 with a local computer in order to provide a remote data connection to a computer network. For example, in telephones using Bluetooth® technology, the relative displacement may be communicated to a Bluetooth® module operating with the Human Interface Device profile. Comparable interfaces may be found in documents published by various task groups under IEEE 802.15 and in the developing Wireless USB standard. Less preferably, the interface may be a peripheral-specific interface such as those found in various 27 MHz, 900 MHz, and 2.4 GHz wireless mice. One of ordinary skill in the art will recognize that the specific communications technologies discussed above are examples of standards or categories of products, and are not to be construed as limiting the invention to a particular type, standard, or implementation of wireless communication hardware and protocols. The peripheral interface transmits the calculated relative displacement, whether in the form of differential coordinates, a motion vector, or other known mathematical means for conveying information concerning motion, to a computer and computer operating system for controlling a command element such as a GUI cursor. Similarly, the peripheral interface transmits the state of the first and/or second buttons 120a, 122a and/or 120b, 122b being used to simulate mouse buttons for use in manipulating that command element.

In a second embodiment, shown in FIGS. 4 and 5, a cellular telephone 200 including a camera unit 250 is provided with an accessory unit 230 having an integrated illuminator 240 and optional optics 280. In this second embodiment, similar features are identified with similar reference numbers, excepting the particular differences described below. The accessory unit 230 is shown as being a U-profiled, clip-like device for engaging a clamshell-type telephone, but could readily be configured as a channel-like device for engaging the sides of various telephone designs, or in manners similar to those used in known telephone holster designs. The accessory unit 230 and described programming are particularly useful as a retrofit means for providing integrated wireless mouse functionality to some pre-existing cellular telephones.

The accessory unit 230 is configured to suspend the camera unit 250 of the telephone 200 above an underlying surface, such as a desktop, when the combined telephone 200 and accessory unit 230 are set down on such a surface. A first portion of the accessory unit 230 defines an aperture 231, and is configured so that the telephone camera unit 250 is positioned under the aperture 231 when the telephone 200 is inserted into the accessory unit 230. Optionally, the accessory unit 230 may include suspending elements such as foot portions 232 and/or glide pads 234 projecting outward from the first portion. The foot portions 232 and/or glide pads 234 act to suspend the combination over the underlying surface when the combination is set down with the camera unit 250 facing the surface, and may also act to protect the underlying surface from cosmetic damage when the combination is manipulated in the manner of a mouse. A source of illumination 240 is positioned in the accessory unit 230 at the aperture 231 and adjacent to the camera unit 250. The source of illumination 240 is configured to illuminate a portion of an underlying surface within the field of view the camera unit 250, i.e., in most designs, to direct light into the aperture 231 and through a volume of space immediately below the camera unit 250. The source of illumination 240 may be mounted within the accessory unit 230 at the aperture 231, and is preferably angled with respect to the general plane of that that portion of the accessory unit 230 to direct the illumination toward the underlying surface. However, the source of illumination 240 may also be mounted within the accessory unit 230, with a transparent lens or light guide 242 acting to direct the illumination to the aperture 231 in the described manner. Optionally, a lens 280 having optical power may be mounted within the aperture 231 to further alter the focal characteristics of a lens assembly 254 in the camera unit 250. Such an additional lens may modify the focal length of the camera 250, but need not be configured to bring the image into proper focus on the imaging sensor 252—rather, the image comparison algorithms may be used to track frame-by-frame differences between either well focused or moderately defocused images of the underlying surface, with the lens 280 increasing the optical power of the built-in lens assembly 254 to permit improved focusing of the underlying surface.

The accessory unit 230 may include an accessory battery 235 and switch 236 for powering and controlling the source of illumination 240. The accessory battery 235 may be a user-replaceable battery, such as a watch battery, but is preferably a rechargeable battery having the same voltage characteristics as the telephone device battery, with the accessory unit 230 providing a charging connector 271 configured to both engage the charging connector 270 of the telephone 200 and present an essentially identical charging connector for engagement by the telephone's charging plug. The accessory battery 235 may thereby be charged in parallel with the telephone battery, with the combined unit being charged by the telephone's charger when not in use.

Alternately, the accessory unit 230 may include a switch 236 and circuit 237 for drawing power from the telephone 200 for the source of illumination 240. An example of such an arrangement may be found in USB On-The-Go type interfaces, in which the telephone 200 may operate as a host device and supply power at plug receptacle 270 (typically at between 4.4 and 5.25 V for currents of <100 mA), and the accessory unit 230 may operate as a peripheral device drawing power through a mating plug 271. Advantageously in such a device, first and second buttons 220b, 222b may be provided on the accessory unit 230 on the side of the unit opposite the aperture 231 and positioned to simulate a typical two button mouse configuration. Programming may be provided to the telephone 200 to detect the actuation of the buttons 220b, 222b through the interface and communicate such events to a wirelessly interfaced computer, as further described below. Alternately, the telephone 200 may be programmed so that existing interface buttons may be used to control wireless mouse functionality. At least one button 210 may be programmed to activate and deactivate a wireless mouse functionality, with a first button 220a programmed to act as a primary mouse button when the device is operated as a mouse and, optionally, a second button 222a programmed to act as a secondary mouse button when the device is operated as a mouse. Optionally, the functionality of the buttons 210, 220a, 222a may be multiplexed to reduce the number of interface buttons required or to accommodate the button layouts in existing telephone designs, with a particular type or sequence of button commands serving to activate and deactivate wireless mouse functionality.

The camera unit 250 of the telephone 200 includes an imaging sensor 252 which is generally a CMOS imaging sensor, although CCD imaging sensors or other imaging sensors might be used depending upon the design goals for the telephone's camera function. Although the telephone itself may be configured in the manner described above in the first embodiment (but lacking a low-energy source of illumination), a significant advantage of the accessory unit 230 is the ability to provide an after-market wireless mouse functionality to telephones not initially manufactured with such a capability. The imaging sensors 252 in such phones typically are capable of capturing video at a reduced resolution, e.g. 320 by 240 pixels or some other fractional portion of the full image sensor resolution, at a frame rate of about 30 frames per second in a so-called "movie mode." When operating with wireless mouse functionality, the telephone 200 may be programmed to execute tracking software performing the steps of capturing video frames as tracking image frames, comparing a current tracking image frame against a prior recorded tracking image frame, computing a relative displacement using known image comparison algorithms, and storing the current tracking image frame as a prior tracking image frame for subsequent computations. When using video frames as tracking image frames, such cameras may be used as wireless mice, but will tend to be limited in the speed with which a user may move the device over an underlying surface because common features must be present in at least two sequential frames. Thus the useful rate of motion of the camera will be limited to a rate determined by the angular field of view of the imaging sensor 252, as modified by any lens 280 provided at the aperture 231, the distance of the lens assembly 254 of the telephone 200 from the underlying surface, and the image frame rate achievable by the camera electronics. However, since the image sensor 252 in such phones will have a wider view of the underlying surface and capture images at a greater resolution than that captured by typical mouse image sensors, useful tracking capability can be provided at frame rates substantially lower than those used in optical mouse sensors. While such tracking capability may be more limited than that described with respect to the first embodiment, the ability to retrofit existing camera phones to provide wireless mouse functionality remains valuable.

The aforedescribed programming may be provided through an update to the telephone's firmware, which will typically require the cooperation of device's manufacturer and the end user's service provider, or may be provided as a user-installable application for programmable platforms such Nokia's S60 platform for telephones based on the Symbian operating system. The actuation of buttons 220b, 222b and the computed relative displacement may be communicated to a preexisting peripheral interface such as, in telephones using Bluetooth® technology, a Bluetooth® module operating with the Human Interface Device profile, or through other such wireless peripheral interfaces such as the developing Wireless USB standard.

The foregoing description of particular embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. An accessory for a hand-held electronics device having an integrated camera unit, comprising:
   a member, sized and shaped for attachment along an outer surface of the hand-held electronics device, the member having an aperture defined therethrough, the aperture being positioned along the member such that when the member is attached to the hand-held electronics device, the aperture is positioned adjacent the camera unit of the hand-held electronics device to allow for image capture thereby;
   a light element disposed within the aperture; and
   a lens mounted in a stationary position within the aperture of the member to modify an optical power of the camera unit,
   wherein the accessory is used as a retrofit means for providing wireless mouse functionality to the hand-held electronics device.

2. The accessory of claim 1, wherein the member has a substantially U-shaped profile with an open end for engaging with a portion of the hand-held electronics device.

3. The accessory of claim 1, further comprising suspending elements projecting outward from a lower portion of the member such that when the member is placed on a surface, the suspending elements elevate the member away from the surface.

4. The accessory of claim 1 further comprising an accessory battery separate from a battery of the electronics device, and an accessory charging connector configured to engage a charging connector of the hand-held electronics device such that when the accessory and the electronics device are combined, the accessory battery is charged in parallel with the battery of the electronics device via a charger of the electronic device.

5. The accessory of claim 1 further comprising a host interface for engagement with a peripheral interface of the hand-held electronics device, wherein the accessory draws power for the light element through the host interface.

6. The accessory of claim 5 further comprising first and second buttons on sides opposite the aperture, wherein a state of the first and second buttons is communicated through the host and peripheral interfaces to the hand-held electronics device, and by a wireless peripheral interface to a computer for use in manipulating a command element.

7. The accessory of claim 1, wherein the light element is a light emitting diode or laser diode, wherein the diode emits monochromatic light having a peak wavelength that is approximately equal to a wavelength of peak sensitivity of at least one of a plurality of types of photosites of an image sensor of the integrated camera unit.

8. The accessory of claim 1, wherein the hand-held electronics device is at least one of a cellular telephone and a device having a cellular telephone functionality.

9. The accessory of claim 1, wherein the lens causes the camera unit to capture an unfocused image of a surface when the accessory and hand-held electronics device are placed thereon.

10. The accessory of claim 1, further comprising software code stored in a memory within the hand-held electronics device, which when executed by the hand-held electronics device, causes the hand-held electronics device and the accessory to together function as an electronic mouse.

11. An accessory for a hand-held electronics device having an integrated camera unit, comprising:
    a member for attachment along an outer surface of the hand-held electronics device, the member having an aperture defined therethrough, the aperture being positioned along the member such that when the member is attached to the hand-held electronics device, the aperture is positioned adjacent the camera unit of the hand-held electronics device to allow for image capture thereby;
    a light element disposed within the aperture; and
    a lens mounted in a stationary position within the aperture of the member to modify an optical power of the camera unit, wherein the accessory and the hand-held electronics device together function as an electronic mouse.

12. The accessory of claim 11, wherein the light element is a light emitting diode or laser diode, and wherein the diode emits monochromatic light having a peak wavelength that is approximately equal to a wavelength of peak sensitivity of at least one of a plurality of types of photosites of an image sensor of the integrated camera unit.

13. The accessory of claim 11, wherein the lens causes the camera unit to capture an unfocused image of a surface when the accessory and hand-held electronics device are placed thereon.

* * * * *